(12) United States Patent
Senthil

(10) Patent No.: US 11,257,391 B2
(45) Date of Patent: Feb. 22, 2022

(54) SYSTEM AND A METHOD FOR VIRTUAL LEARNING OF DRIVING A VEHICLE

(71) Applicant: Nithin S Senthil, Sammamish, WA (US)

(72) Inventor: Nithin S Senthil, Sammamish, WA (US)

(73) Assignee: Nithin S Senthil

( * ) Notice: Subject to any disclaimer, the term of this patent is extended or adjusted under 35 U.S.C. 154(b) by 67 days.

(21) Appl. No.: 16/859,008

(22) Filed: Apr. 27, 2020

(65) Prior Publication Data

US 2021/0335146 A1    Oct. 28, 2021

(51) Int. Cl.
| | | |
|---|---|---|
| *G08B 9/00* | (2006.01) |
| *G09B 9/052* | (2006.01) |
| *G08B 6/00* | (2006.01) |
| *G08B 21/18* | (2006.01) |
| *G09B 9/058* | (2006.01) |

(52) U.S. Cl.
CPC ............. *G09B 9/052* (2013.01); *G08B 6/00* (2013.01); *G08B 21/182* (2013.01); *G09B 9/058* (2013.01)

(58) Field of Classification Search
CPC ........ G08B 9/052; G08B 21/182; G08B 6/00; G09B 9/058
See application file for complete search history.

(56) References Cited

U.S. PATENT DOCUMENTS

| | | | |
|---|---|---|---|
| 10,126,423 B1* | 11/2018 | Fowler .............. | B60W 50/16 |
| 10,233,679 B1* | 3/2019 | Chan .................. | G01S 13/931 |
| 10,977,956 B1* | 4/2021 | Madison ............ | A63F 13/245 |
| 2014/0035736 A1* | 2/2014 | Weddle ............... | G06T 19/006 |
| | | | 340/407.2 |
| 2014/0364209 A1 | 12/2014 | Perry | |
| 2015/0002278 A1* | 1/2015 | Shah .................. | G08B 6/00 |
| | | | 340/407.1 |
| 2015/0024347 A1* | 1/2015 | Son .................... | G09B 9/04 |
| | | | 434/69 |
| 2015/0193868 A1* | 7/2015 | Del Vecchio ....... | H04L 67/10 |
| | | | 705/35 |
| 2016/0282943 A1* | 9/2016 | Laurendeau ......... | G06F 3/038 |

(Continued)

FOREIGN PATENT DOCUMENTS

| | | |
|---|---|---|
| AU | 2018200822 A1 | 8/2018 |
| CN | 108766097 A | 11/2018 |
| CN | 106960612 A | 8/2019 |

*Primary Examiner* — Ojiako K Nwugo
(74) *Attorney, Agent, or Firm* — Jason C. Cameron

(57) ABSTRACT

A system for virtual learning of driving a vehicle is provided. The system includes a driving unit with a steering wheel, a brake pedal, and an accelerator pedal, wherein the driving unit is activated upon receiving an activation code from a user via a computing device. A head mount device, communicatively coupled to the driving unit, displays a simulated street view to the user via the computing device, thereby training the user to operate the vehicle. A haptic generation module monitors a plurality of real-time operative parameter values during operation of the vehicle by the user; compares the plurality of current operative parameter values with a plurality of pre-defined threshold parameter values respectively; and generate a haptic feedback alert for the user based on comparison of the current operative parameter values with the plurality of predefined threshold parameter values respectively.

11 Claims, 4 Drawing Sheets

(56) References Cited

U.S. PATENT DOCUMENTS

| | | | |
|---|---|---|---|
| 2018/0330632 A1* | 11/2018 | Fonarov | A63H 17/05 |
| 2019/0050520 A1* | 2/2019 | Alvarez | G06F 30/15 |
| 2019/0108768 A1* | 4/2019 | Mohamed | G09B 9/04 |
| 2020/0020244 A1* | 1/2020 | Best | G09B 9/052 |
| 2020/0035114 A1* | 1/2020 | Koga | G09B 9/04 |
| 2020/0086883 A1* | 3/2020 | Kim | B60W 50/082 |
| 2021/0005064 A1* | 1/2021 | Culbertson | G08B 6/00 |

\* cited by examiner

SYSTEM AND A METHOD FOR VIRTUAL LEARNING OF DRIVING A VEHICLE

FIELD OF INVENTION

Embodiments of the present disclosure relate to learning system, and more particularly to, a system and a method for virtual learning of driving a vehicle.

BACKGROUND

In recent years, the automotive industry has been developing at a rapid rate and has become a big part of people's lives on a daily basis. Most people learn to drive by tutors from driving schools.

Conventionally driving schools take on a few people to train the people on how to drive a vehicle, such as, including but not limited to, a car. However, due to an increase in the popularity of owning a car, numerous people register themselves for driving lessons at the driving school, thereby not having enough time for the driving school to train a large set of people. Hence, the people either need to wait for months for the driving school to train them or might try to learn by themselves, which may be hazardous.

In another scenario, not all people have the capacity to learn driving in a limited time, even if taught by the driving school. This leaves people with a disadvantage where they cannot practice the skills learned in the driving school nor are the people confident enough to drive a car on roads for practice purposes.

In another scenario, most of the countries have different road and driving rules than the others, which puts people from foreign countries at a disadvantage for not knowing the road and driving rules of a particular country they would want to drive in. further, in order to learn the road and driving rules of a particular country, an individual may have to investee time in learning the same.

In another scenario, people may not know how to drive in a different weather conditions, which again put them at a disadvantage. Hence, if an individual, who is above average at driving on city roads may not be able to drive in a hilly region.

Therefore, there is a requirement for a system that can overcome the aforementioned issues.

BRIEF DESCRIPTION

In accordance with one embodiment of the disclosure, a system for virtual learning of driving a vehicle is provided. The system includes a driving unit comprising a steering wheel, a brake pedal, and an accelerator pedal, wherein the driving unit is activated upon receiving an activation code from a user via a computing device. The system also includes a head mount device communicatively coupled to the driving unit, wherein the head mount device is configured to display a simulated street view to the user via the computing device, thereby training the user to operate the vehicle. The system also includes a haptic generation module communicatively coupled to the driving unit and the computing device, wherein the haptic generation module is configured to monitor a plurality of real-time operative parameter values during operation of the vehicle by the user; compare the plurality of current operative parameter values with a plurality of pre-defined threshold parameter values respectively; and generate a haptic feedback alert for the user based on comparison of the current operative parameter values with the plurality of predefined threshold parameter values respectively.

Further, the system also includes a customization module comprising at least one of a plurality of virtual themes representing a plurality of driving conditions and one or more driving rules for corresponding one or more countries, for the user to select from for training purposes. The system also includes an analysis module configured to generate one or more reports associated with the training of the user.

In accordance with another embodiment of the disclosure, a method for virtual learning of driving a vehicle is provided. The method includes activating a driving unit upon receiving an activation code from a user via a computing device, wherein the driving unit comprises a steering wheel, a brake pedal, and an accelerator pedal; displaying, by a head mount device, a simulated street view to the user via the computing device to train the user to operate the vehicle; monitoring, by a haptic generation module, a plurality of real-time operative parameter values during operation of the vehicle by the user; comparing, by the haptic generation module, the plurality of real-time operative parameter values with a plurality of predefined threshold parameter values respectively; and generating, by the haptic generation module, a haptic feedback alert for the user based on comparison of the plurality of real-time operative parameter values with the plurality of predefined threshold parameter values respectively.

Further, the method includes additional steps of selecting, by the user from a customization module, a virtual theme from a plurality of virtual themes representing a plurality of driving conditions; and selecting, by the user from the customization module, a country from one or more countries having one or more driving rules. The method also includes generating, by an analysis module, one or more reports associated with the training of the user.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, multiple components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
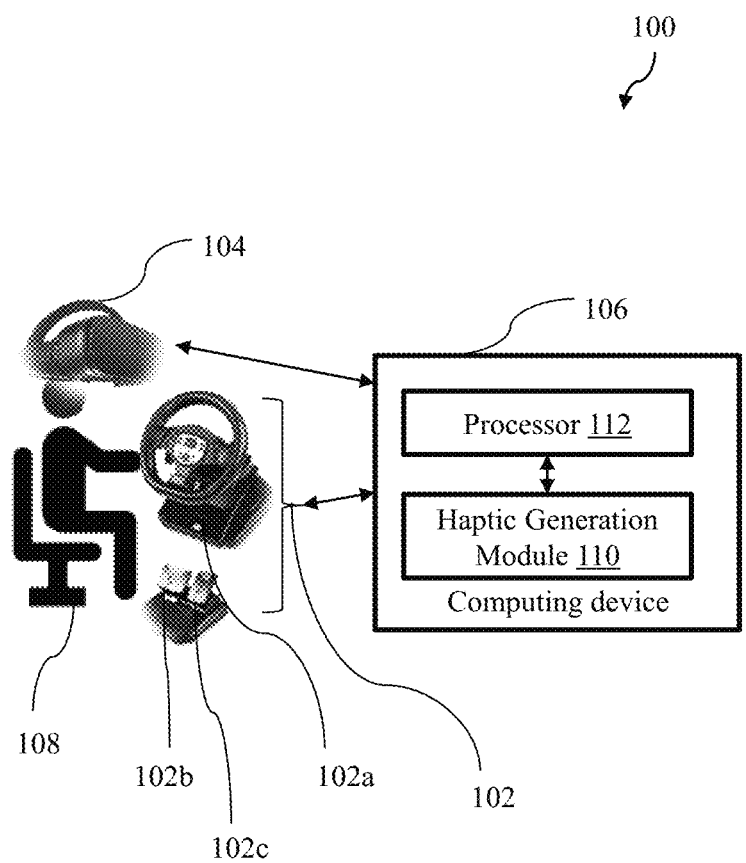
FIG. 1 illustrates a block diagram of a system for virtual learning of driving a vehicle in accordance with an embodiment of the present disclosure.

FIG. 1 illustrates a pictorial representation of a system 100 for virtual learning of driving a vehicle in accordance with an embodiment of the present disclosure. The system 100 includes a driving unit 102, a head mount display device 104 and a computing device 106. In one embodiment, the driving unit 102 includes a steering wheel 102a, a brake pedal 102b, and an accelerator pedal 102c. In one embodiment, the head mount display device 104 is a virtual reality device. In one embodiment, the computing device 106 is, including but not limited to, a smartphone and a laptop. The computing device 106 is communicatively coupled to the driving unit 102 and the head mount display device 104, wherein the driving unit 102 is activated by the computing device 106 upon receiving an activation code from a user 108. In one embodiment, upon activating the driving unit 102, the user 108 is enabled to select, via the computing device 106, a learning level of operation of a vehicle, from multiple learning levels, such as, including but not limited to, a beginner level, a mid-level and an expert level. In one embodiment, the operation of the vehicle refers to, including but not limited to, driving the vehicle. Once the user 108 selects the level, say the beginner level, a basic level of simulated streets is displayed via the head mount display device 104. In one embodiment, the beginner level includes teaching the basics of driving the vehicle to the user 108. In one embodiment, the vehicle may be, including but not limited to, a two-wheeler and a four-wheeler, such as, including but not limited to, a motorcycle and a car, respectively. The user 108 is enabled to use the steering wheel 102a to drive through the simulated street, and the system also teaches the user 108, including but not limited to, when to apply brakes, when to accelerate, how to turn into lanes and parking and un-parking the vehicle The computing device 106 includes a haptic generation module 110 operable by one or more processors 112. The haptic generation module 110 is configured to monitor multiple real-time operative parameter values during the operation of the vehicle. In one embodiment, the multiple real-time parameters are, including but not limited to, a speed of the vehicle, if the user 108 has applied an indicator, a distance at which a turning indicator must be applied from a turning lane, and a speed at which the vehicle runs over a speed breaker. The haptic generation module 110 further compares the multiple real-time operative parameter values with multiple pre-defined threshold parameter values respectively, wherein the comparison is performed in real-time. In one embodiment, the multiple pre-defined threshold parameter values refer to ideal values, such as, including but not limited to, speed of the vehicle, application of an indicator prior to turning into a lane, a distance at which the indicator needs to be applied prior to turning into the lane and a speed at which the vehicle is supposed to be traveling in while running over the speed brake. Based on compared result, the haptic generation module 110 generates a haptic feedback alert for the user 108. In one embodiment, the haptic feedback alert may be, including but not limited to, vibrating at least one of the steering wheels 102a, the brake pedal 102b, and the accelerator pedal 102c, or vibrating the whole driving unit 102 at once. In one embodiment, the frequency of vibration is about 10 Hz to 20 Hz Further, the computing device 106 includes a customization module, operable by the one or more processors 112, which includes multiple virtual themes representing multiple driving conditions and/or one or more driving rules for corresponding one or more countries, for the user 108 to select from for training purposes. In one embodiment, the multiple virtual themes representing the multiple driving conditions may include, a hilly region, a snow region, a sandy region and a curvy area. In one embodiment, once the user 108 has learned basics of driving, the user 108 is enabled to select a virtual theme from the multiple virtual themes, so that the user 108 may improve over the basic driving skills according to the region he lives in or wishes to drive in. In one embodiment, the one or more driving rules are, including but not limited to, driving either on a left-hand side of a road or right-hand side of the road and should not honk unless it's an emergency.

Further, the computing device 106 includes an analysis module, operable by the one or more processors 112, which generates one or more reports associated with the training of the user 108. In one embodiment, the one or more reports includes a second-person perspective and a third-person perspective, wherein the user may check or review the performance or learning in a second person view. In addition, a driving school instructor is enabled to review the performance of the user and provide feedback to the user from a third person perspective. Further, in one embodiment, the driving unit 102 may also include a gear stick and associated elements, enabling the user 108 to learn to shift gears while driving.

Figure 2:
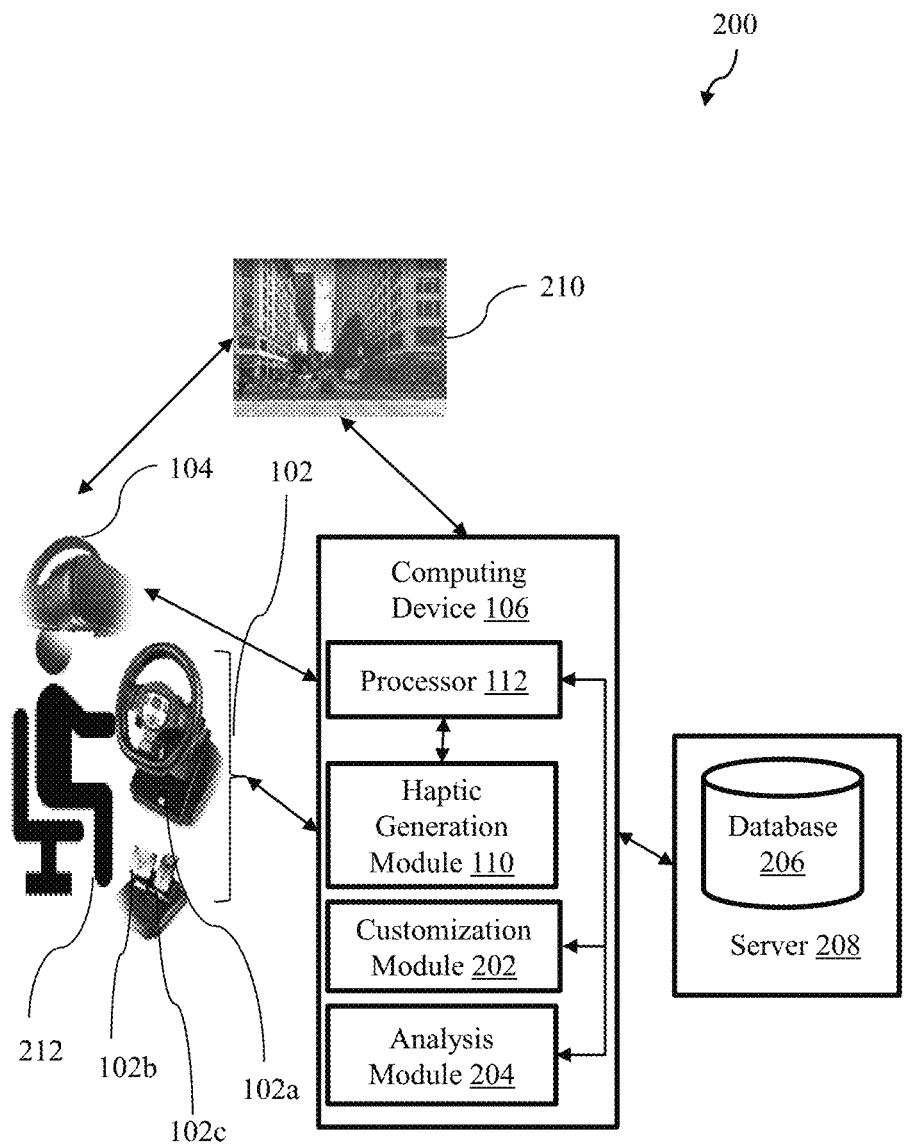
FIG. 2 illustrates a block diagram of an exemplary embodiment of FIG. 1 in accordance with an embodiment of the present disclosure.

FIG. 2 illustrates a block diagram of an exemplary embodiment 200 of FIG. 1 in accordance with an embodiment of the present disclosure. The driving unit 102 is provided to one or more students 212 who want to learn how to drive a vehicle—a car. Each of the one or more students 212 are also provided with the head mount display device 104 and an activation code, wherein each of the one or more students 212 are required to activate the driving unit 102, via the computing device 106, with the activation code. For example, the head mount display device 104 is a virtual reality headset. In one embodiment, the activation code is provided onto a platform in the computing device 106, wherein the platform supports the working of the driving unit 102 and the virtual reality headset. In one embodiment, the activation code provided by the student 212 is stored in a database 206 hosted in a server 208. Upon activating the driving unit 102, the head mount display device 104 is initiated via the computing device 106. The driving unit 102 includes the steering wheel 102a, the brake pedal 102b, and the accelerator pedal 102c. A student 212 is required to be seated on a seater with the brake pedal 102b and the accelerator pedal 102c at the feet of the student 212 and the steering wheel 102a at arm's length. The student 212 is required to select a learning level from one or more levels displayed to the student 212 by the platform via the computing device 106. For example, the student 212 selects a beginner level via the computing device 106, and the student 212 is required to put on the virtual reality headset. Since the level selected by the student 212 is the beginner level, the virtual reality headset displays a simulated street 210 view with no vehicles via the computing device 106. In the beginner level, the student 212 is taught basics of driving, such as, including but not limited to, how to use the steering wheel 102a, when to apply brakes, when to accelerate and how much to accelerate, at what distance should an indicator be applied in an event of making a turn into a lane, and which indicator needs to be applied for turning in a particular direction, how to park and un-park the car, and distance between the car and surrounding vehicles in a traffic. In one embodiment, once the student 212 learns the basics of driving the car, the student 212 is enabled to practice and improve the driving skills. In one embodiment, the student 212 is enabled to practice the driving skills by displaying a few other vehicles in the simulated street display, so that the student 212 may learn how to manoeuvre the car around the few other vehicles. While learning and practicing, the haptic generation module 110 monitors the driving skills of the student 212. For example, if the student 212, while practicing or learning hits a sidewalk, which is considered to be a real-time operative parameter, then the haptic generation module 110 generates a haptic feedback alert for the student 212 by comparing the real-time operative parameter with a predefined threshold parameter value—the student 212 is not supposed to hit the sidewalk. In one embodiment, the multiple predefined threshold parameter values are stored in the database 206. Since the real-time operative value does not match the predefined threshold parameter value, the haptic generation module 110 generates the haptic feedback to the student 212 via the steering wheel 102a, wherein the haptic feedback is provided to the student 212 by vibrating the steering wheel 102a. In another example, if the student 212 is driving the car at about 80 km/hr in a lane for vehicles traveling at about 40 km/hr, then the haptic generation module 110 generates an alert for the student 212 by vibrating the steering wheel 102a.

Further, the student 212 is then enabled to climb up the learning levels, wherein the student 212 is presented with higher levels of difficulty with each higher level, and as the student 212 clears each level, more confident the student 212 feels to drive on real streets and traffic. In one embodiment, every time the student 212 makes a mistake while driving, the haptic generation module 110 generates the haptic feed for the student 212 to let the student 212 know of the mistakes. In one embodiment, activities of the user 108 associated with training the user 108 are stored in the database 206, wherein the activities represent progress or regress with the training of the student 212. In one embodiment, the progress includes, but not limited to, levels completed by the student 212, a time duration in which each level is completed, and a number of mistakes committed at each level. In one embodiment, the regress includes, but not limited to, if the student 212 takes longer time duration to complete a level, and if the student 212 commits numerous mistakes in a level. Further, the student 212 is enabled to select a virtual theme from the multiple themes, i.e., if the student 212 wants to learn how to drive the car in a hilly region, then the virtual reality headset displays simulated roads in a hilly region. When the student 212 learns to drive in the hilly region and makes a mistake, the haptic generation module 110 generates the haptic feedback for the student 212 by vibrating the steering wheel 102a. In one embodiment, the multiple themes are stored in the database 206. Further, the student 212 is enabled to select a country from one or more countries in which he/she would like to drive. In one embodiment, the one or more countries and corresponding one or more rules are stored in the database 206. For example, if the student 212 chooses the United State of America, then said country's road and traffic rules are applied, wherein the student 212 is taught to drive according to the rules of the said country, i.e., including but not limited to, driving on the right-hand side of the road.

Figure 3:
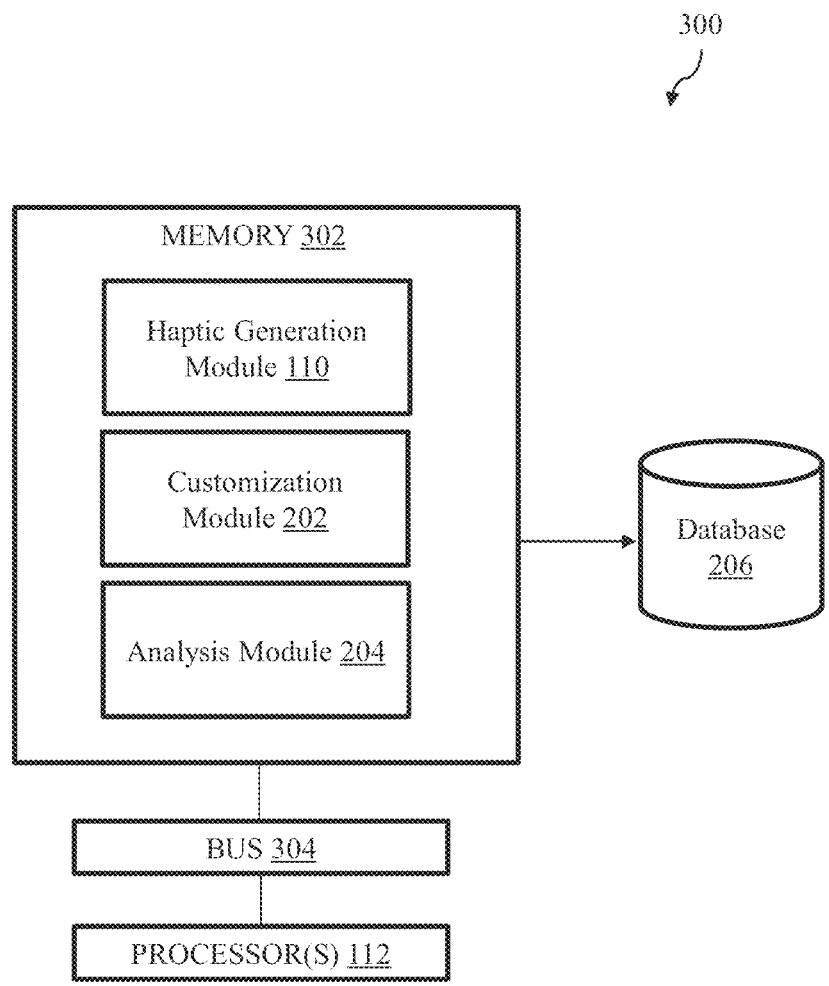
FIG. 3 illustrates a block diagram representation of a processing subsystem located on a remote server in accordance with an embodiment of the present disclosure.

FIG. 3 illustrates a block diagram representation of a processing subsystem (300) located on a remote server 208 in accordance with an embodiment of the present disclosure. The system includes the processor(s) 112, a bus 304 and a memory 302 coupled to the processor(s) 112 via the bus 304, and the database 206. The processor(s) 112, as used herein, means any type of computational circuit, such as but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof. The bus 304 as used herein is a communication system that transfers data between components inside a computer, or between computers.

Figure 4:
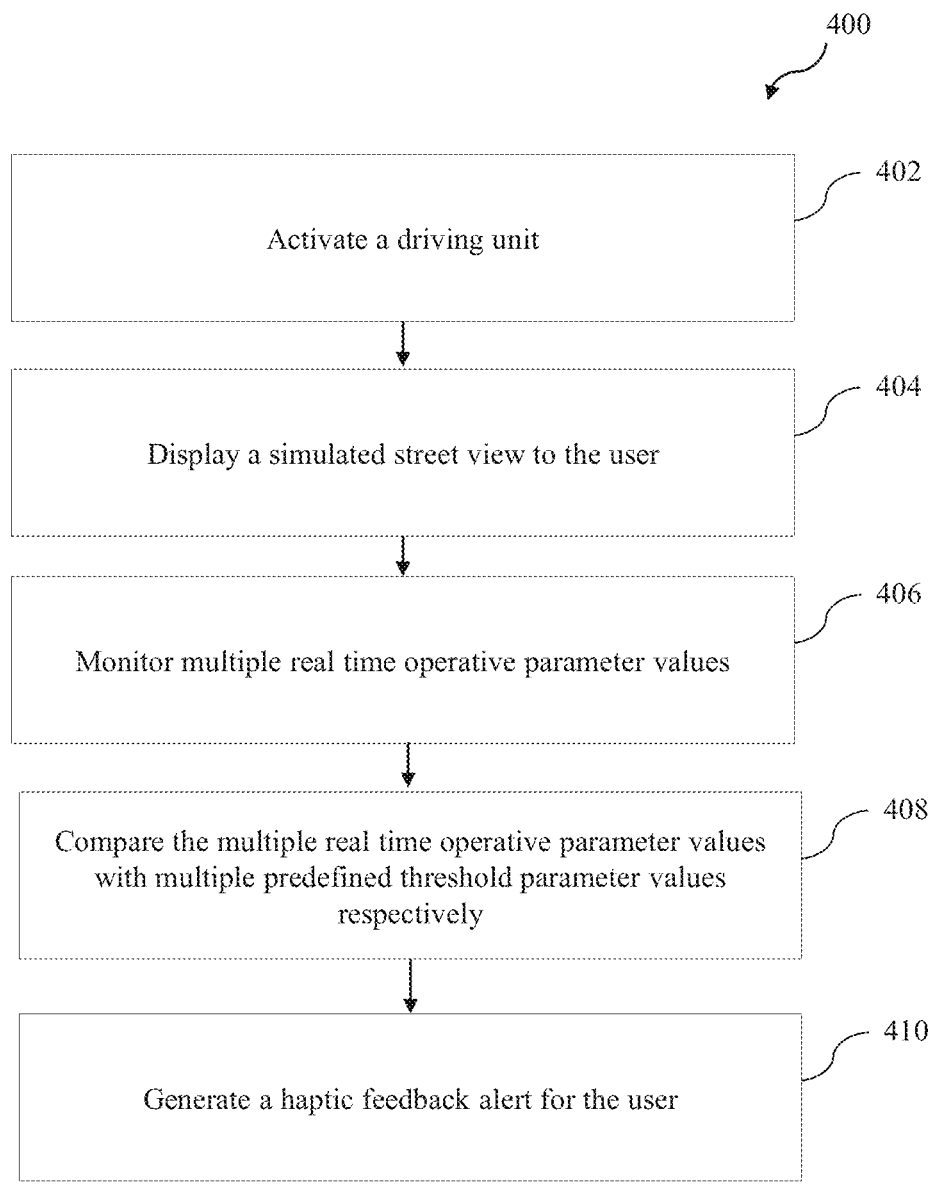
FIG. 4 illustrates a flow chart representing steps involved in a method for FIG. 1 in accordance with an embodiment of the present disclosure.

The memory 302 includes multiple modules stored in the form of an executable program that instructs the processor 112 to perform the method steps illustrated in FIG. 4. The memory 302 has the following modules: the haptic generation module 110, operable by the one or more processors, is configured to monitor multiple real-time operative parameter values during operation of the vehicle by the user 108; compare the multiple real-time operative parameter values with multiple pre-defined threshold parameter values respectively; and generate a haptic feedback alert for the user 108 based on comparison of the multiple real-time operative parameter values with the multiple predefined threshold parameter values respectively. The customization module 202, operable by the one or more processors, is configured to generate one or more reports associated with the training of the user 108. Embodiments of the present subject matter may be implemented in conjunction with program modules, including functions, procedures, data structures, and application programs, for performing tasks, or defining abstract data types or low-level hardware contexts. The executable program stored on any of the above-mentioned storage media may be executable by the processor(s) 112.

FIG. 4 illustrates a flow chart representing steps involved in a method 400 for FIG. 1 in accordance with an embodiment of the present disclosure. The method 400 includes activating a driving unit, in step 402. The method 400 includes activating the driving unit upon receiving an activation code from a user via a computing device, wherein the driving unit comprises a steering wheel, a brake pedal, and an accelerator pedal. In one embodiment, the computing device is, including but not limited to, a smartphone and a laptop. The computing device is communicatively coupled to the driving unit and the head mount display device. The method 400 includes displaying a simulated street view to the user, in step 404. The method 400 includes displaying, by a head mount display device, the simulated street view to the user via the computing device to train the user to operate the vehicle. In one embodiment, upon activating the driving unit, the user is enabled to select, via the computing device, a learning level of operation of a vehicle, from multiple learning levels, such as including but not limited to, a beginner level, a mid-level and an expert level. In one embodiment, the operation of the vehicle refers to, including but not limited to, driving the vehicle. Once the user selects the level, say the beginner level, a basic level of simulated streets is displayed via the head mount display device. In one embodiment, the beginner level includes teaching the basics of driving the vehicle to the user. The user is enabled to use the steering wheel to drive through the simulated street, and the system also teaches the user, including but not limited to, when to apply brakes, when to accelerate, how to turn into lanes and parking and un-parking the vehicle.

The method 400 includes monitoring multiple real-time operative parameter values, in step 406. The method 400 includes monitoring, by a haptic generation module, the multiple real-time operative parameter values during operation of the vehicle by the user. The computing device includes the haptic generation module operable by one or more processors. In one embodiment, the multiple real-time parameters are, including but not limited to, a speed of the vehicle, if the user has applied an indicator, a distance at which a turning indicator must be applied from a turning lane, and a speed at which the vehicle runs over a speed breaker. The method 400 includes comparing the multiple real-time operative parameter values with multiple pre-defined threshold parameter values respectively, in step 408. The method 400 includes comparing, by the haptic generation module, the multiple real-time operative parameter values with the multiple predefined threshold parameter values respectively, wherein the comparison is performed in real-time. In one embodiment, the multiple pre-defined threshold parameter values refer to ideal values, such as, including but not limited to, speed of the vehicle, application of an indicator prior to turning into a lane, a distance at which the indicator needs to be applied prior to turning into the lane and a speed at which the vehicle is supposed to be traveling in while running over the speed brake. The method 400 includes generating a haptic feedback alert for the user, in step 410. The method 400 includes generating, by the haptic generation module, the haptic feedback alert for the user based on comparison of the multiple real-time operative parameter values with the multiple predefined threshold parameter values respectively. In one embodiment, the haptic feedback alert may be, including but not limited to, vibrating at least one of the steering wheels, the brake pedal, and the accelerator pedal, or vibrating the whole driving unit at once.

Further, the method 400 includes selecting, by the user from a customization module, a virtual theme from multiple virtual themes representing multiple driving conditions. In one embodiment, the multiple virtual themes representing the multiple driving conditions may include, a hilly region, a snow region, a sandy region and a curvy area. In one embodiment, once the user has learned basics of driving, the user is enabled to select a virtual theme from the multiple virtual themes, so that the user may improve over the basic driving skills according to the region he lives in or wishes to drive in. Further, the method 400 includes selecting, by the user from the customization module, a country from one or more countries having one or more driving rules. In one embodiment, the one or more driving rules are, including but not limited to, driving either on the left-hand side of a road or right-hand side of the road and should not honk unless it's an emergency. Further, the method 400 includes generating, by an analysis module, one or more reports associated with the training of the user. In one embodiment, the one or more reports includes a second-person perspective and a third-person perspective.

The system and method for virtual learning of driving a vehicle, as disclosed herein, provides various advantages, including but not limited to, enables a user to learn to drive and improve from anywhere, without having to physically go to a driving school, keeps track of the user's activities while training the user, and generates real-time haptic feedback to the user upon committing a mistake While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for virtual learning of driving a vehicle, comprising:
   a driving unit comprising a steering wheel, a brake pedal, and an accelerator pedal, wherein the driving unit is activated upon receiving an activation code from a user via a computing device;
   a head mount display device communicatively coupled to the driving unit, wherein the head mount device is configured to display a simulated street view to the user via the computing device, thereby training the user to operate the driving unit; and
   a haptic generation module communicatively coupled to the driving unit and the computing device, wherein the haptic generation module is configured to:

monitor a plurality of real-time operative parameter values during operation of the vehicle by the user;

compare the plurality of current operative parameter values with a plurality of pre-defined threshold parameter values respectively; and generate a haptic feedback alert for the user based on comparison of the current operative parameter values with the plurality of predefined threshold parameter values respectively a customization module communicatively coupled to the driving unit and the computing device, wherein the customization module comprising at least one of a plurality of virtual themes representing a plurality of driving conditions and one or more driving rules for corresponding one or more countries, for the user to select from for training purposes.

2. The system of claim 1, wherein the head mount device comprises a virtual reality device.

3. The system of claim 1, wherein the computing device comprises a smartphone and a laptop.

4. The system of claim 1, wherein the plurality of current operative parameters and the plurality of predefined threshold parameter values comprises speed of the vehicle, distance from a lane at which a turning indication should be applied, and speed at which the vehicle runs over a speed breaker.

5. The system of claim 1, wherein comparison of the plurality of current operative parameter values with a plurality of pre-defined threshold parameter values respectively, is performed in real-time.

6. The system of claim 1, wherein the haptic feedback alert comprises vibration of at least one of the steering wheel, the brake pedal, and the accelerator pedal or a combination thereof.

7. The system of claim 1, further comprising an analysis module configured to generate one or more reports associated with the training of the user.

8. A method for virtual learning of driving a vehicle comprising:

activating a driving unit upon receiving an activation code from a user via a computing device, wherein the driving unit comprises a steering wheel, a brake pedal, and an accelerator pedal;

displaying, by a head mount device, a simulated street view to the user via the computing device to train the user to operate the vehicle;

monitoring, by a haptic generation module, a plurality of real-time operative parameter values during operation of the vehicle by the user;

comparing, by the haptic generation module, the plurality of real-time operative parameter values with a plurality of predefined threshold parameter values respectively;

generating, by the haptic generation module, a haptic feedback alert for the user based on comparison of the plurality of real-time operative parameter values with the plurality of predefined threshold parameter values respectively selecting, by the user from a customization module, a virtual theme from a plurality of virtual themes representing a plurality of driving conditions; and selecting, by the user from the customization module, a country from one or more countries having one or more driving rules.

9. The method of claim 8, wherein training the user to operate the vehicle comprises training to drive the vehicle.

10. The method of claim 8, wherein comparing the plurality of real-time operative parameter values with a plurality of predefined threshold parameter values respectively, is performed in real-time.

11. The system of claim 8, further comprising generating, by an analysis module, one or more reports associated with the training of the user.

* * * * *